United States Patent

[11] 3,627,880

[72] Inventors Tadashi Arai
No. 50-6 6-chome, Nogata-machi, Nakano-ku, Tokyo, Japan;
Shyuko Kuroda, 727 University Ave. S.E., Minneapolis, Minn. 55414
[21] Appl. No. 482,464
[22] Filed Aug. 25, 1965
[45] Patented Dec. 14, 1971
[32] Priority Aug. 31, 1964
[33] Japan
[31] 39/48603

[54] ANTIBIOTIC COPIAMYCIN
5 Claims, 2 Drawing Figs.

[52] U.S. Cl. .................................................... 424/120, 195/80

[51] Int. Cl. ...................................................... A61k 21/00
[50] Field of Search ............................................ 167/65; 195/80

[56] References Cited
OTHER REFERENCES
Derwent Farmdoc No. 20, 556, Abstracting Netherlands Patent No. 6,511,353, Published 3-1-66

*Primary Examiner*—Jerome D. Goldberg
*Attorneys*—Curtis W. Carlson, Richard H. Brink, Robert B. Simonton and Herbert W. Taylor, Jr.

ABSTRACT: Copiamycin is a new antifungal agent and is produced by the cultivation of Streptomyces hygroscopicus var. crystallogenes. Copiamycin inhibits the growth of certain fungi.

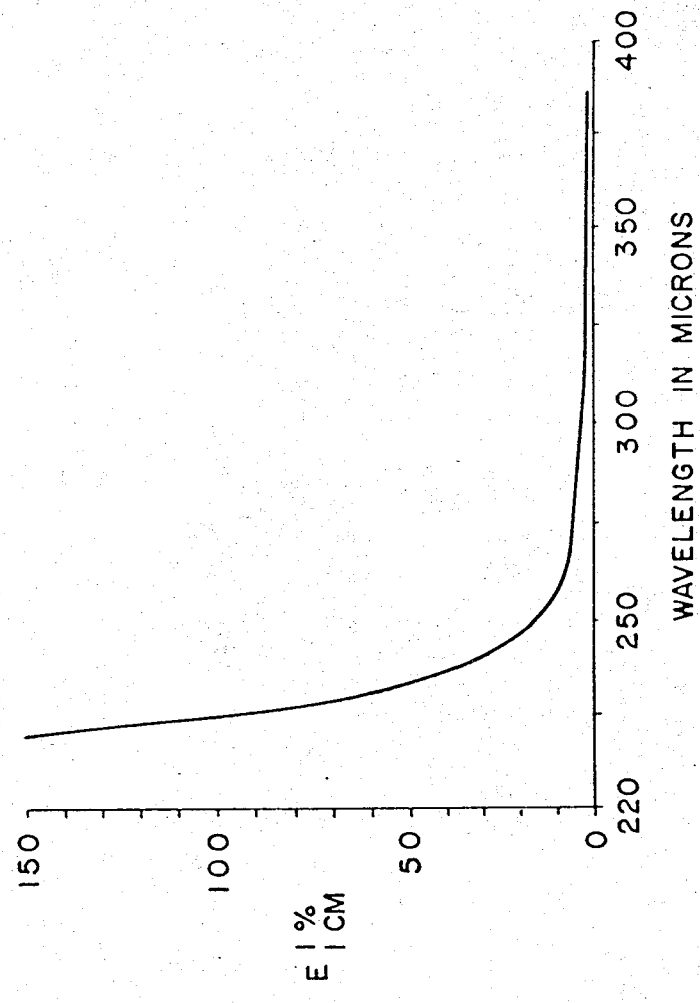

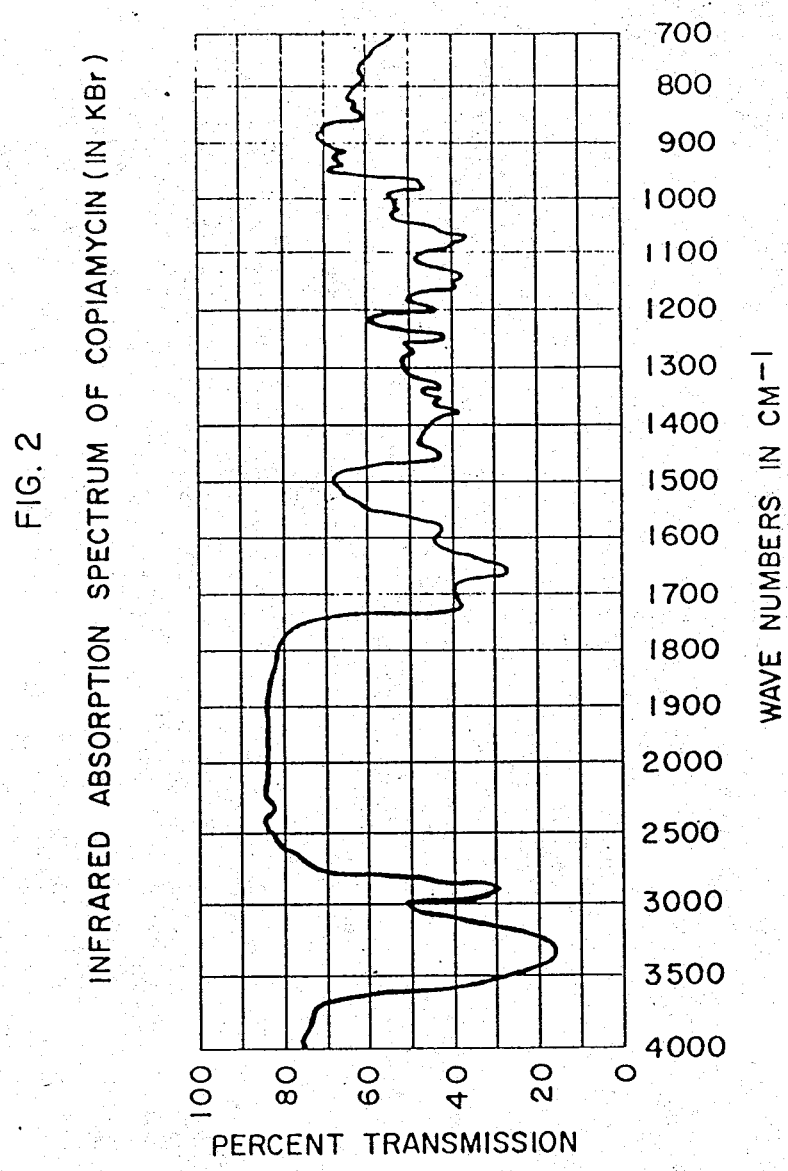
FIG. 2 INFRARED ABSORPTION SPECTRUM OF COPIAMYCIN (IN KBr)
TADASHI ARAI
SHYUKO KURODA   INVENTORS
BY CURTIS W. CARLSON
   RICHARD H. BRINK
   ROBERT B. SIMONTON
   HERBERT W. TAYLOR, JR.
       ATTORNEYS.

ANTIBIOTIC COPIAMYCIN

This invention relates to a new composition of matter, and more particularly, to a new and useful antifungal agent designated as copiamycin, derived from *Streptomyces hygroscopicus* var. *crystallogenes*, and to a method of producing said agent.

There has been increasing demand for chemical agents for the control and prevention of food spoilage caused by fungi, as well as for the control and treatment of fungal diseases which affect plants and animals. It is therefore an object of the present invention to provide an improved composition of matter for the control of the growth of fungi, and a method of producing said composition. Other objects of the invention and uses of said composition will be apparent as the specification proceeds.

The novel antibiotic of the present invention, herein identified as copiamycin, is produced by growing the microorganism, *Streptomyces hygroscopicus* var. *crystallogenes*, under controlled aerobic conditions in a deep culture fermentation medium containing a source of carbon and nitrogen, and the usual essential trace minerals. The parent culture of *Streptomyces hygroscopicus* var. *crystallogenes* was isolated from a soil sample taken from a garden of Horyuji Temple, Nara Prefecture, Japan. The isolation was carried out by standard dilution procedures employing a culture media which is selective for Streptomyces. The organism *Streptomyces hygroscopicus* var. *crystallogenes* is a new variant micro-organism heretofore unknown, and is a member of *Streptomyces hygroscopicus* according to the classification of Waksman (*The Actinomycetes*, Vol. II, pp. 143–144, 1961). A careful study of the morphology and physiology of the organism *Streptomyces hygroscopicus* var. *crystallogenes* shows it to be distinctly different from known species and variants of *Streptomyces hygroscopicus* and therefore the organism of the present invention is a new variant of Streptomyces. The term "crystallogenes" used to identify the novel variant of *Streptomyces hygroscopicus* is descriptive of the culture, and means that in the solid medium around the growth of said organism, a number of small crystals of unidentified nature are formed. From a study of the characteristics of the Streptomyces species contained in *Bergey's Manual of Determinative Bacteriology* (Sixth Edition, 1948), *Guide to the Identification of the Actinomycetes and Their Antibiotics*, Waksman and Lechevalier, 1953, and *The Actinomycetes*, Vol, II, Waksman, 1961, the strain belongs to the series of hygroscopicus. A culture of *Streptomyces hygroscopicus* var. *crystallogenes* has been deposited in the American Type Culture Collection, Rockville, Md., and added to its permanent collection of micro-organisms as A.T.C.C. No. 19040.

Copiamycin is useful for the control and prevention of food spoilage caused by fungi as well as for the control of fungal diseases which affect plants, and for the treatment of fungal infections in animals. The antifungal agent is also useful in separating and classifying mixtures of micro-organisms for biological research, and for the removal of micro-organisms from laboratory equipment and medical and dental instruments.

The following is a description of *Streptomyces hygroscopicus* var. *crystallogenes*. (Designations as to color are based on Maerz and Paul's *A Dictionary of Color*, Second Edition, McGraw-Hill Book Company, Inc., New York, N.Y., 1950.)

MORPHOLOGY

On glycerol asparagine agar, sporophores monopodiallly branched with numerous closed spirals (sinistrorse) arranged in clusters. Spirals produced in four to six turns, 20 $\mu$ in diameter. Spores, short cylindrical 1.0–2.0×1.0–1.2 $\mu$, with warty surface structure.

CULTURAL CHARACTERISTICS

Sucrose nitrate agar: Growth light yellow (PL10–C–2) to cinnamon brown (PL12–D–8). Aerial mycelium abundant, powdery, white with gray patches (PL31–A–1) becoming dark gray. Soluble pigment none or slightly brown.

Glucose asparagine agar: Growth spreading, citron to orange (PL10–F–3), later brownish. Aerial mycelium abundant, powdery, slightly yellowish white with brownish gray parts, later becoming moist and black. Soluble pigment none.

Nutrient agar: Growth spreading, minute colonies with elevated centers, light grayish to yellowish brown. Aerial mycelium scant, white. Some parts of colonies remain naked. Soluble pigment none.

Ca-malate glycerol agar: Growth spreading, raised colonies, canary yellow (PL11–I–3) to buff (PL11–K–7). Aerial mycelium abundant, white to greenish yellow (PL18–J–1). Soluble pigment light greenish yellow.

Yeast extract agar: Growth spreading, raised colonies with depressed centers, brown. Aerial mycelium abundant, dull white to ash gray. Soluble pigment none.

Tyrosine agar: Raised colonies, reddish brown to dark brown. Aerial mycelium abundant, light greenish yellow. Soluble pigment faint pink becoming reddish brown with age.

Potato plug: Growth raised, brown to dull brown. Aerial mycelium white with grayish tinge, later mouse gray. Color of plug unchanged.

Carrot plug: Growth abundant, raised, light buff. Aerial mycelium abundant, cream-colored to ash gray turning black with age. Soluble pigment none.

Milk: Cream-colored ring. Strong peptonization without coagulation, pH 6.4.

Gelatin stab: Growth cream-colored to brown. Liquefaction strong. No soluble pigment.

Blood agar: Colonies round, elevated, greenish brown with smooth surface. Peripheral parts wrinkled. No aerial mycelium. Soluble pigment none.

$H_2S$ production: Negative.

Nitrate reduction: Negative.

Starch is moderately hydrolyzed.

Cellulose not decomposed.

The ability of *Streptomyces hygroscopicus* var. *crystallogenes* to utilize various commercially available sources of carbon is as follows: glucose, arabinose, fructose, lactose, maltose, sucrose, inositol, raffinose, galactose, rhamnose, xylose, inulin, adnitol, dulcitol, mannitol, sorbitol, sodium succinate and sodium citrate are utilized; and sodium acetate does not support the growth of the organism. The test for carbon utilization was carried out according to the procedures of T. C. Pridham and D. Gottlieb ("The Utility of Carbon Compounds by Some Actinomycetes as an Aid to Species Determination," *Journal of Bacteriology*, 56, 107–114, 1948). The organism *Streptomyces hygroscopicus* var. *crystallogenes* is capable of growing over a temperature range of 20° C. or less, up to 40° C., but not effectively at 45° C. and above. The main characteristics of *Streptomyces hygroscopicus* var. *crystallogenes* (formation of closed spirals in aerial mycelium, warty structure of spore surface, nonchromogenicity, lack of significant production of soluble pigment in any medium, and gray coloration of aerial mycelium on most media, which readily moistened turning almost black) clearly indicate that the organism belongs to *Streptomyces hygroscopicus* series (Tresner and Backus, "A Broadened Concept of the Characteristics of *Streptomyces hygroscopicus*," Applied Microbiology, 4, 243–250, 1956). However, when *Streptomyces hygroscopicus* var. *crystallogenes* is compared with *Streptomyces hygroscopicus* CBS (Westerdijk) and *Streptomyces endus* (Gottlieb's strain), differences in their cultural characteristics and physiological properties are evident. These differences are summarized in table I.

Such differences are also noticed when the characteristics of *Streptomyces hygroscopicus* var. *crystallogenes* are compared with the description of *Streptomyces platensis* or *Streptomyces humidus* which are also members of *Streptomyces hygroscopicus* series. Furthermore, *Streptomyces hygroscopicus* var. *crystallogenes* forms abundant microcrystals in the medium around the growth when cultured on yeast extract agar or malt extract agar. The organism is also characterized by the production of a novel antibiotic, copiamycin.

TABLE I

| | Streptomyces hygroscopicus var. crystallogenes | Streptomyces hygroscopicus | Streptomyces endus |
|---|---|---|---|
| Sucrosenitrate agar: Growth | Light yellow to cinnamon brown | White to light brown | Light brown turning dark. |
| Ca-malate glycerol agar: | | | |
|   Growth | Canary yellow | Grayish brown | Light cream-colored. |
|   Soluble pigment | Light greenish yellow | None | None. |
| Yeast extract agar: Soluble pigment | None | do | Slightly brown. |
| Carrot plug: Aerial mycelium | Cream colored | Mouse gray | Mouse gray. |
| Tyrosine agar: Soluble pigment | Faint pink | None | None. |
| Hemolysis | Positive | Negative | Negative. |
| Morphology: Spirals | 4-6 loops | 4-6 loops | 10 loops. |

Copiamycin is produced by the fermentation of the microorganism *Streptomyces hygroscopicus* var. *crystallogenes* under suitable conditions. It is understood that this process is not limited to *Streptomyces hygroscopicus* var. *crystallogenes*, but is intended to include the use of mutants produced from the described organism by various means such as X-radiation, ultraviolet radiation and nitrogen mustards, and also to include copiamycin-producing micro-organisms of this same species regardless of their origin. The fermentation is carried out in an aqueous nutrient medium at a temperature of about 24°–35° C., and under submerged conditions of agitation and aeration. Although various materials can be used in the fermentation as nutritive sources, the medium preferably includes a source of carbon, such as sugars, starch, dextrin, glycerol, and a source of inorganic or organic nitrogen, such as ammonium sulfate, sodium nitrate, ammonium chloride, casein, corn meal, soy bean meal, peanut meal, wheat gluten, cottonseed meal, lactalbumin, enzymatic digests of casein and tryptone. A source of growth substances such as yeast extract, molasses fermentation residues as well as sodium chloride, potassium phosphate, sodium nitrate, magnesium sulfate, and trace minerals such s copper, zinc, iron and manganese may also be utilized. If excessive foaming is encountered during fermentation, antifoaming agents such as vegetative oils may be added to the fermentation medium. A buffering agent such as calcium carbonate may also be added to the medium. Inoculum for the preparation of copiamycin by fermentation of *Streptomyces hygroscopicus* var. *crystallogenes* may be obtained by employing growth from slants of such media as Emerson's agar or glucose-asparagine agar. The growth may be used to inoculate either shaken flasks or inoculum tanks for submerged growth or alternatively the inoculum tanks may be seeded from the shaken flasks. The growth of the micro-organism usually reaches its maximum in about 2 or 3 days, however, variations in the equipment used, the rate of aeration, the rate of stirring, etc. may affect the speed with which maximum activity is reached. In general, the fermentation is continued until substantial amounts of copiamycin are accumulated in the mycelium. Aeration of the medium in tanks for submerged growth is maintained at the rate of about one-half to two volumes of free air per volume of broth per minute.

To recover copiamycin from the culture, the broth is first filtered, and the mycelial cake collected. MOst of the antibiotic remains in the mycelial cake, and is recovered therefrom by extraction with alcohols containing from one to five carbon atoms, such as methanol, ethanol, propanol, butanol and pentanol. One solvent which is especially suitable for extraction is methanol. The alcohol extracts are concentrated in vacuo and during the concentration, an amorphous precipitate gradually accumulates. The precipitate increases when the pH of the concentrate is lowered. The light tan-colored precipitate thus obtained is repeatedly washed with water. This process removes about 50 percent of the original material and leaves an almost white material. The precipitate is again washed with acetone and the residue is dissolved in a small amount of methanol. The active principle is fractionally precipitated by the addition of acetone. Crude copiamycin is further purified by chromatography on a silica gel column. The column is developed with solvent mixtures of chloroform and methanol (3:1 and 1:1). Active fractions are checked by Dragendorff reagent which gives positive coloration with copiamycin. The active fractions are combined and concentrated in vacuo. The residue is recrystallized from aqueous methanol, and then from methanol. Copiamycin crystallizes as colorless platelets, decomposes at 144° C., and is soluble in methanol, ethanol, n-butanol, pyridine, dimethylformamide, glacial acetic acid, but almost insoluble in acetone, dioxane, chloroform, carbon tetrachloride, esters, petroleum ether, benzene, methyl isobutyl ketone, and water. The elemental analysis of copiamycin which is dried on $P_2O_5$ under vacuum is as follows: C, 58.30%; H, 8.90%; N, 3.94%; O, 28.86% (by difference). No halogen or sulfur is detected. The optical rotation is $[\alpha]_D^{25.5}=+=+14.4$ (c, 4.15% in methanol). The ultraviolet absorption spectrum in methanol shows only rising end absorption in methanol ($E_{1cm}^{1\%}$ 74 at 230 m$\mu$) (FIG. 1). The infrared absorption spectrum of copiamycin in potassium bromide tablet shows the following absorption: 3360, 2925, 1725, 1660, 1580, 1450, 1375, 1355, 1325, 1270, 1240, 1195, 1160, 1140, 1070, 1025, 1010, 980, 940, 920, 855, 835, 790 and 715 cm.$^{-1}$ (FIG. 2).

PUrified preparation of copiamycin gives only one spot when chromatographed on filter paper in varying solvent systems and bioautographed against *Candida albicans*. R$f$ values and solvent systems employed are summarized in table II.

TABLE II

| Solvent System | R$f$ |
|---|---|
| n-butanol-methanol-H$_2$O (4:1:2) | 0.76 |
| n-butanol-pyridine-H$_2$O (3:4:7) | 0.96 |
| 50% acetone | 0.83 |
| benzene-methanol (4:1) | 0.28 |
| 75% phenol | 0.95 |
| 3% NH$_4$Cl | 0.06 |
| water saturated with n-butanol | 0.03 |
| n-butanol saturated with water | 0.52 |
| t-butanol-H$_2$O (4:1) | 0.65 |

Single spots are also always obtained when the antibiotic is studied by thin-layer chromatography. R$f$ values as revealed by Dragendorff reagent (*J. Chromatography*, Vol. 13, p. 393, 1964) or sulfuric acid are 0.4 and 0.5 with silica gel G layer and solvent systems of acetic acid-n-butanol-water (6:25:25) and n-butanol-methanol-water (4:1:2), respectively. R$f$ values of 0.7 and 0.3 are obtained with aluminum oxide layer and solvent systems of pyridine-n-butanol-water (4:6:3) and benzene-methanol (4:1), respectively. The antibiotic produces negative reactions to biuret, ninhydrin, Molisch, ferric chloride, Liebermann-Burchard, 2,4-dinitrophenylhydrazine, but positive to Fehling, Dragendorff and platinic iodide. It also gives pinkish coloration with concentrated sulfuric acid which turned brown with time. The antibiotic decolorized bromine and potassium permanganate solutions. No loss of activity occurred when a methanol solution of copiamycin is heated at 60° C. for 60 minutes in a sealed tube. At 100° C., however, the activity decreased to one-half of the original after 10 minutes and one-eighth after 1 hour.

The following tables illustrate the antimicrobial spectrum of copiamycin. The spectra were determined with bacteria and fungi strains by agar streak method. Solutions of copiamycin in dimethyl sulfoxide of various concentrations were prepared, and added to the medium in 1 percent. Media used for the determinations as well as incubation periods are also indicated in the tables.

TABLE III

Antimicrobial Spectrum of Copiamycin

| Organism | Medium | Minimal Inhibitory Dose (mcg./ml.) |
|---|---|---|
| Bacillus subtilis PCI 219 | Nutrient agar | >100 |
| Bacillus cereus | Nutrient agar | >100 |
| Staphylococcus aureus 209p | Nutrient agar | >100 |
| Staphylococcus albus | Nutrient agar | >100 |
| Sarcina lutea | Nutrient agar | >100 |
| Mycobacterium 607 | Nutrient agar | >100 |
| Escherichia coli F₁ | Nutrient agar | >100 |
| Escherichia coli, SM resistant | Nutrient agar | >100 |
| Aerobacter aerogenes | Nutrient agar | >100 |
| Klebsiella pneumoniae | Nutrient agar | >100 |
| Serratia marcescens | Nutrient agar | >100 |
| Pseudomonas aeruginosa | Nutrient agar | >100 |

Incubation: 37° C. for 48 hours for Mycobacterium 607; 24 hours for others.

TABLE IV

Antifungal Spectrum Of Copiamycin

| Organism | Medium | Minimal Inhibitory Dose (mcg./ml.) | |
|---|---|---|---|
| | | 48 Hrs. | 72 Hrs. |
| Saccharomyces cerevisiae | glucose Czapek agar | 2.5 | 2.5 |
| Saccharomyces carlsbergensis | " | 5.0 | 5.0 |
| Zygosaccharomyces sanken | " | 10.0 | 10.0 |
| Torula rubra Saito | " | 2.5 | 2.5 |
| Mycoderma sp. Takahashi | " | 1.0 | 2.5 |
| Willia anomala | " | 10.0 | 25.0 |
| Aspergillus Niger ATCC6275 | " | 10.0 | 10.0 |
| Aspergillus oryzae | " | 7.5 | 10.0 |
| Penicillium glacum | " | 10.0 | 10.0 |
| Mucor mucedo | " | 2.5 | 2.5 |
| Rhizopus nigricans | " | 2.5 | 5.0 |
| Candida albicans IFM strain | Sabouraud Agar | 2.5 | 2.5 |
| Candida albicans ATCC 3170 | " | 5.0 | 5.0 |
| Candida albicans ATCC3036 | " | 5.0 | 5.0 |
| Candida albicans Shinkai | " | 5.0 | 5.0 |
| Candida albicans Nakagawa | " | 2.5 | 5.0 |
| Candida albicans Saito | " | 5.0 | 5.0 |
| Candida albicans YU-1200 | " | 1.0 | 1.0 |
| Candida guilliermondi | " | 5.0 | 5.0 |
| Candida tropicalis | " | 2.5 | 2.5 |
| Candida krusei | " 2.5 | 2.5 | 2.5 |
| Candida parakrusei | " | 5.0 | 5.0 |
| Candida stellatoidea | " | 2.5 | 5.0 |

Incubation: 37°C. for Candida, 27°C. for others.

TABLE V

Antifungal Spectrum of Copiamycin

| Organism | Minimal Inhibitory Dose (mcg./ml.) | | |
|---|---|---|---|
| | 48 Hrs. | 72 Hrs. | 120 Hrs. |
| Cryptococcus neoformans A 704 | 0.5 | 0.5 | 1.0 |
| Cryptococcus neoformans A 759 | 0.5 | 0.5 | 0.75 |
| Picnia membranaefaciens 0460 | 1.0 | 1.0 | 2.5 |
| Debaryomyces hansenii IFO 0023 | 2.5 | 2.5 | 2.5 |
| Debaryomyces kloeckeri IFO 0015 | 2.5 | 2.5 | 2.5 |
| Microsporum gypseum 706 | 1.0 | 1.0 | 1.0 |
| Microsporum canis 701 | – | 0.5 | 1.0 |
| Sporotrichum schenckii 602 | | 2.5 | 2.5 |
| Sporoboromyces salmonicolor IFO 0374 | 0.5 | 0.5 | 0.5 |
| Blastomyces dermatitidis 506 | – | – | 0.5 |
| Monosporium apiospermum 213 | 0.5 | 1.0 | 2.5 |
| Hormodendrum compactum 517 | 0.75 | 1.0 | 2.5 |
| Histoplasma capsulatum 570 | 0.25 | 0.25 | 0.25 |
| Epidermophyton floccosum 1 | 0.5 | 0.5 | 0.5 |
| Trichosporon cutaneum IFO 0116 | 0.1 | 0.5 | 0.75 |
| Trichophyton interdigitale | – | – | 2.5 |
| Trichophyton rubrua | – | – | 0.75 |
| Trichophyton concentricum IFO 0116 | – | – | 0.5 |
| Trichophyton crateriforme | – | – | >10.0 |
| Trichophyton tonsurans | – | – | 1.0 |
| Trichophyton sabouraudi | – | – | 1.0 |

It is apparent from table III that copiamycin is inactive against Gram-positive and Gram-negative bacteria including Mycobacterium 607. On the other hand, the antibiotic is active against a wide range of fungi, as shown in tables IV and V. Most strains are inhibited at a concentration below 10 mcg./ml., and there is not significant difference in the minimal inhibitory concentrations between filamentous and yeastlike forms of fungi. No hemolysis of sheep red blood cells was observed up to 100 mcg./ml. of copiamycin.

The acute toxicity of copiamycin was determined with mice weighting 19 to 22 g. When finely pulverized copiamycin was suspended in 0.5 percent carboxy-methylcellulose saline solution and administered intraperitoneally, subcutaneously and orally, the mice tolerated 1,000 mg./kg. of the antibiotic without any toxic sign for 14 days.

As is evident from the above biological characteristics, copiamycin is an antibiotic having antifungal properties. Antibiotics designated as ascomycin, azalomycins, endomycin, hygroscopin A, hygrostatin, phytostreptin, phytoactin, nigericin, and stendomycins are known antifungal agents, and are isolated from cultures of Streptomyces hygroscopicus, or closely related organisms, but copiamycin can be readily differentiated from these antibiotics. Ascomycin has not been obtained in pure state yet, but the antibiotic is mainly active on filamentous fungi and physiochemical properties are also quite different from those of copiamycin. Although phytostreptin, phytoactin and stendomycins lack characteristic absorption maximum in the ultraviolet region, they are polypeptides as revealed by specific color reaction, infrared absorption spectrum and degradation products. Copiamycin is more readily differentiated from the other antifungal antibiotics of the Streptomyces hygroscopicus series. Among antifungal antibiotics from other sources than Streptomyces hygroscopicus, niromycin, streptovitacins and cerevioccidin are described in the art as exhibiting no absorption maxima in the ultraviolet spectrum. These three antibiotics are not active against Candida albicans, which clearly differentiates them for copiamycin.

The following examples will illustrate the invention described herein without unduly restricting it.

EXAMPLE 1

Production of copiamycin in shake flasks with a soy bean meal glucose medium. The micro-organism Streptomyces hygroscopicus var. crystallogenes A.T.C.C. No. 19040 is maintained on an agar slant of the following ingredients:

| | |
|---|---|
| Soluble starch | 10 g. |
| Polypeptone | 5 g. |
| Bacto beef extract | 3 g. |
| Glucose | 2 g. |
| $K_2HPO_4$ | 0.8 g. |
| $FeSO_4$ | 0.1 g. |
| Potato extract to 1,000 ml. (pH 7.0) | |

The potato extract is prepared by simmering 100 g. of white potato slices for 40 minutes in 1,000 ml. water. To prepare the agar slant, 2.5 g. of agar is added to the above medium, and sterilized at 15 pounds steam pressure for 30 minutes. A well sporulated slant is used to inoculate 100 ml. of a broth having the following composition:

| | |
|---|---|
| Soy bean meal | 20 g. |
| Dried yeast | 5 g. |
| Soluble starch | 25 g. |
| $MnCl_2 \cdot 4H_2O$ | 0.007 g. |
| $CuSO_4 \cdot 5H_2O$ | 0.007 g. |
| $ZnSO_4 \cdot 7H_2O$ | 0.03 g. |
| $CaCO_3$ | 3.5 g. |
| Distilled water | 1000 ml. | pH is adjusted at 7.2 and autoclaved at 15 pounds steam pressure for 30 minutes

One hundred and fifty 500 ml. shake flasks containing 100 ml. of the above medium inoculated from the agar slants are incubated at 25° C. for 90 hours on a reciprocal shaker (150 r.p.m.). At the end of this period, the cultures are combined and the mycelial cake is harvested by filtration. The mycelial cake is repeatedly washed with water, and 1.7 kg. of wet mycelium is extracted with two volumes of methanol. The extract is separated by filtration, and the residue is again extracted with an equal volume of methanol. The two extracts having a greenish light brown color are combined, and found to assay 5120 dilution units against *Candida albicans*. The combined extracts are concentrated in vacuo at a temperature below 60° C. to one-tenth the volume of the original. Sixty-five grams of wet crude material are collected by centrifugation and repeatedly washed with water, and 30.9 g. of almost white material is obtained. The material is extracted with 200 ml. acetone, and the residue is dissolved in a small amount of methanol. To this is added five volumes of acetone, and the precipitating active fraction is collected by centrifugation. Dried crude copiamycin thus obtained, weighs 5.9 g. The crude copiamycin is dissolved in a small amount of solvent mixture, chloroform-methanol (3:1), and loaded on a silica gel G column. The column is developed with the same solvent mixture, and Dragendorff reagent positive fractions are combined and concentrated in vacuo. Precipitating copiamycin is recrystallized from aqueous methanol, and then from methanol. Copiamycin weighing 1.92 g. is obtained in the form of colorless plates.

EXAMPLE 2

Production of copiamycin in a 200 liter tank. One hundred and fifty 500 ml. shake flasks containing 100 ml. of a broth having the following composition are inoculated from agar slants as in example 1.

| | |
|---|---|
| Meat extract | 5 g. |
| Polypeptone | 10 g. |
| Soluble starch | 5 g. |
| Glucose | 5 g. |
| NaCl | 1.5 g. |
| Distilled water 1,000 ml. | | pH is adjusted at 7.2 and autoclaved at 15 pounds steam pressure for 30 minutes

They are incubated at 25° C. for 2 days on a rotary shaker (280 r.p.m.). A 10 percent inoculum is then made from the above and introduced into a tank containing 100 ml. of the soy bean meal medium described in example 1. Aeration and agitation are maintained one-half of medium and 250 r.p.m., respectively. The incubation is continued for 90 hours at 25° C.

After the incubation, 8 kg. of wet mycelium is harvested from 95 liters of broth by filtration. The mycelial cake is washed by centrifugation with 6 liters of water. The mycelial cake is extracted twice with 16 liters and 8 liters of methanol, respectively. The methanol extracts are combined and concentrated in vacuo to 3 liters, and filtered. The brown precipitate obtained weighs 122 g. The precipitate is washed with 1 liter of water, and then extracted with 1 liter of acetone. The residue is dissolved in 1 liter of methanol, and 5 liters of acetone is added. The precipitating antibiotic is further purified according to the procedure described in example 1, and 40 g. of purified copiamycin is obtained.

EXAMPLE 3

Extraction of copiamycin from whole culture broth. A culture broth prepared as described in example 1 is extracted with one-half volume and one-fourth volume of n-butanol. Butanol extracts are combined and concentrated in vacuo. The remaining syrup is dissolved in a small amount of methanol, and chromatographed as described in example 1 on a silica gel column. The active fractions are combined and concentrated; and to this is added water. Copiamycin crystals precipitate immediately and increase on standing. One gram of purified copiamycin is obtained from 10 liters of culture broth.

What is claimed is:

1. A composition of matter designated copiamycin, which in its essentially pure crystalline form is in the form of colorless platelets and is characterized by a melting point of 144° C. (with decomposition); an elemental analysis as follows: C, 58.30%; H, 8.90%; N, 3.94%; O, 28.86% (by difference); an optical rotation $[\alpha]_D^{25} = +14.4$ (c, 4.15 percent in methanol); ready solubility in pyridine, dimethylformamide, glacial acetic acid; moderate solubility in methanol, ethanol, n-butanol; and substantial insolubility in acetone, dioxane, chloroform, carbon tetrachloride, esters, petroleum ether, benzene, methyl isobutyl ketone and water; an ultraviolet absorption spectrum in methanol as shown in FIG. 1 of the drawings; and an infrared absorption spectrum in potassium bromide as shown in FIG. 2 of the drawings.

2. Crystalline copiamycin as defined in claim 1.

3. The process of producing an antibiotic designated copiamycin which comprises cultivating *Streptomyces hygroscopicus* var. *crystallogenes* A.T.C.C. No. 19040 under submerged aerobic conditions in an aqueous nutrient medium until substantial antifungal activity is produced in said medium.

4. The process of producing an antibiotic designated copiamycin which comprises cultivating *Streptomyces hygroscopicus* var. *crystallogenes* A.T.C.C. No. 19040 under submerged, aerobic conditions in an aqueous nutrient medium until substantial antifungal activity is produced in said medium and recovering copiamycin from said medium.

5. The process of claim 4 wherein said medium contains assimilable carbohydrate and nitrogenous material, and *Streptomyces hygroscopicus* var. *crystallogenes* A.T.C.C. No. 19040 is cultivated for about 2 to 5 days at about 24° to 35° C.

* * * * *